Jan. 13, 1953     T. WASSERMAN ET AL     2,625,488

PROCESSING OF HEAT SENSITIVE FLUIDS

Filed June 14, 1950

T. WASSERMAN &
M. E. LAZAR
INVENTORS

BY L. M. Martel
ATTORNEY.

Patented Jan. 13, 1953

2,625,488

UNITED STATES PATENT OFFICE 2,625,488

PROCESSING OF HEAT-SENSITIVE FLUIDS

Theodore Wasserman, San Francisco, and Melvin E. Lazar, Oakland, Calif., assignors to the United States of America as represented by the Secretary of Agriculture Application June 14, 1950, Serial No. 168,133

4 Claims. (Cl. 99—216)

(Granted under Title 35, U. S. Code (1952), sec. 266)

This application is made under the act of March 3, 1883, as amended by the act of April 30, 1928, and the invention herein described, if patented in any country, may be manufactured and used by or for the Government of the United States of America for governmental purposes throughout the world without the payment to us of any royalty thereon.

This invention relates to the processing of heat-sensitive materials, in particular the invention relates to apparatus and methods for heating fluid foodstuffs, such heating being for the purpose, for example, of causing sterilization, pasteurization, enzyme inactivation, or evaporation of the foodstuff. The principal object of this invention is to provide the apparatus and the technique whereby such heating can be performed rapidly and efficiently and without causing appreciable heat damage to the foodstuff. Further objects and advantages of the invention will be obvious from the description herein.

In the accompanying drawings which are given merely by way of illustration:

Figure 1:
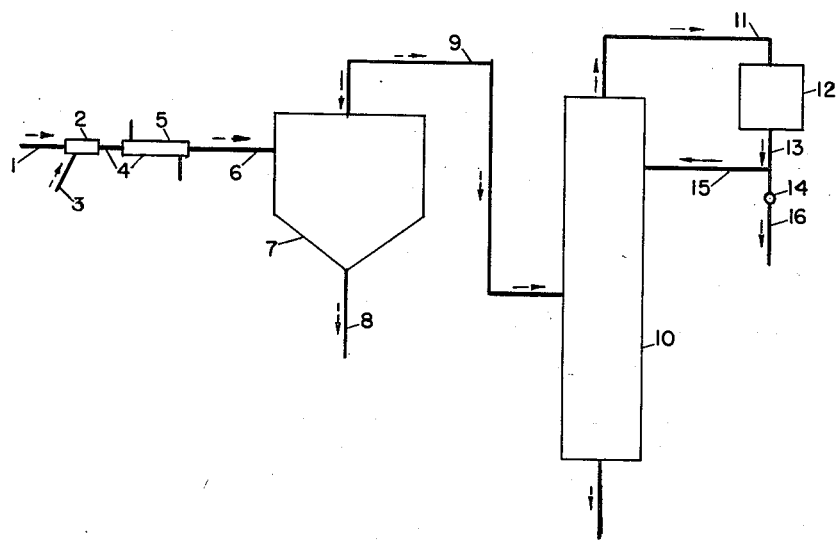
Fig. 1 represents diagrammatically one form of apparatus for carrying out our process.

In the preparation of foodstuffs for preservation by any of the commonly used methods, it is essential that the foodstuff be heated at some stage in its processing. The heat processing step may be required for any one of several reasons, as for example, sterilization, pasteurization, enzyme inactivation, evaporation, and so forth. Many methods and devices are known and used in the industry for such purposes. The most common method is to heat the foodstuff in a vessel or heat exchanger by indirect thermal contact, i. e., through a heat transfer surface, with steam or other heated medium. One of the main disadvantages of such known techniques is that heating does not take place uniformly throughout the body of the foodstuff. Thus the portions of foodstuff closest to the source of heat are heated more rapidly than portions further away from the source of heat. This has the ultimate result that in order to ensure all portions of the foodstuff being brought to the proper processing temperature, some portions thereof must necessarily be overheated with consequent damage to the flavor of the foodstuff. Another problem associated with non-uniform heating is that the portions of foodstuff closest to the source of heat tend to increase in viscosity as a result of overheating whereby the rate of heat transfer is decreased and further, these overheated portions of material tend to stick to the walls of the apparatus thus impeding the flow of material and requiring frequent shut downs for cleaning purposes.

We have now devised a system for heating foodstuffs which alleviates the problems outlined above. In brief our system involves heating the foodstuff in two distinct stages. In the first stage, the foodstuff is mixed with steam whereby the foodstuff is rapidly and uniformly brought up to the desired temperature in a very brief period of time, i. e., less than one second. The hot mixture is then discharged into the second stage wherein it is further heated by indirect thermal contact, i. e., through a heat transfer surface with steam or other heated medium. At the inlet to this second stage, the hot mixture is at least partially flash vaporized, the resulting increase in volume causes an increase in velocity whereby a high rate of heat transfer is obtained, the vapor and liquid are in turbulent flow whereby thorough mixing is obtained thus to obtain uniform heating, and further the high velocity effects a scrubbing action on the heating surfaces which prevents the surfaces from becoming fouled.

The hot material from the second heating stage is then discharged into a separator to separate the liquid foodstuff from the vapors. This separator can be maintained at subatmospheric pressure whereby additional evaporation will take place together with cooling of the foodstuff.

The direct steam heating stage referred to above, involves simultaneously introducing the foodstuff and steam into a mixing zone. In this operation, two factors contribute to the rapid heating of the foodstuff. One is that the foodstuff and steam are intimately admixed due to the turbulent flow conditions existing in the mixing zone. The other is that the steam and foodstuff are introduced in such proportions that at any instant the increment of steam admitted is the amount of steam required to raise the simultaneously-admitted increment of foodstuff to the desired processing temperature. In general, this proportion is about 0.1 lb. of steam per lb. of foodstuff for each 100° F. rise in temperature desired. By proceeding in such manner, heating is virtually instantaneous thus the time required to bring each increment of foodstuff to the desired processing temperature is always less than one second and usually less than one-tenth second.

Various alternatives may be employed in our system. For example, the vapors evolved from the separator may be subjected to rectification and/or condensation to recover the volatile essences and these may be returned to the finished product. Such procedure is particularly advantageous in the treatment of fruit juices and purees which contain volatile flavoring constituents which are lost in conventional heating procedures.

Other alternatives are that the degree of vacuum in the separator and/or the temperature in the heat stages may be so regulated as to get many desired end results. For example, if the foodstuff is merely to be pasteurized or sterilized the above conditions may be so regulated as to get little or no concentration of the foodstuff. On the other hand if it is desired to produce a concentrate then the conditions may be regulated so as to obtain a limited degree of concentration upon release of the hot mixture into the separator.

Another alternative is that the length of the second heating stage of our system may be increased as much as necessary to obtain a high degree of concentration of the feed before the vapors are separated from the fluid residue.

Some of the advantages of our apparatus and method over conventional systems are listed below:

In the first place, in our system the heating and cooling are both extremely rapid. Thus we are enabled to bring the foodstuff from room temperature up to temperatures as high as 300–325° F., depending upon the pressure of available steam, and back to room temperature all in less than two seconds. This rapid heating is an essential feature of our system and is the main reason why no appreciable heat damage to the foodstuff occurs. The final products produced in accordance with this invention have virtually the same flavor as the natural product.

Another point is that in our system, heating is uniform throughout the body of the foodstuff. In the first heating stage, the heating is obtained by introducing steam into the foodstuff. The resulting mixture flows through the device under turbulent flow conditions whereby there is intimate mixing of steam and foodstuff and there is no possibility of any part of the foodstuff being over- or under-heated. At the inlet to the second heating stage, the partial flash evaporation which takes place increases the total volume of material whereby the resulting high velocity causes turbulent flow with the result that the liquid and vapor components are kept in intimate admixture again to prevent local over- or underheating.

A further advantage of our system is that it can be used for long periods of operation without fouling. The principle of our system as it affects fouling may be explained as follows: When a fluid is passed through a conventional tubular evaporator where it is subjected to heat through the walls of the evaporator, more than half of the length of the evaporator can be regarded as a preheater where the fluid is brought up to boiling temperature. It is this first section of tubular evaporators where the major fouling occurs. Thus in this section of the evaporator, the velocities are relatively low and the portions of foodstuff close to the walls become overheated whereby the material sticks to the walls of the evaporator. This fouling of the tube reduces heat transfer and further interferes with the proper flow of material through the tube and necessitates frequent shut downs for cleaning. In our system, we have in effect eliminated this preheating or first section of the tubular evaporator. Instead we initially heat the foodstuff by mixing it with steam in the first stage. Then this hot mixture is discharged into the second stage which is, in essence, a short tubular heater or evaporator. The hot material from the first stage is at least partially vaporized when it enters the second stage heater, the resulting increase in volume causes a large increase in velocity so that a scrubbing action ensues which prevents any deposition of material on the walls of the second stage heater. To summarize then in our system, heating by indirect thermal contact with a hot medium is never applied to a wholly liquid material but only to a material which is composed of both liquid and vapor and which consequently has such high velocity as to prevent fouling.

A further advantage of our system is that it is very easily regulated to change over from one type of processing to another. By simple adjustment of the steam pressure supplied to the heaters and/or adjustment of the pressure in the separator, the system can be changed from one suitable to pasteurization or sterilization to one suitable for concentration or stripping of volatile components.

Another item is that in our system, provision is made for recovery of volatiles. Thus, the volatile essences ordinarily lost in conventional procedures can be recovered and returned to the product.

In Fig. 1 of the drawing annexed hereto is shown diagrammatically one form of apparatus for carrying out the process of this invention. The apparatus and its functions are described as follows:

The foodstuff to be processed is introduced through pipe 1 into injection heater 2. Simultaneously steam is introduced into heater 2 through pipe 3. In heater 2 these materials are thoroughly admixed by the turbulent conditions therein existing. The hot mixture then flows through pipe 4 into tubular heater 5. Since the mixture in heater 2 is superheated with respect to the pressure in heater 5, the hot mixture entering heater 5 is partly vaporized. The resulting mixture of liquid and vapor is further heated and vaporized in heater 5 and then discharged through pipe 6 into separator 7. In separator 7 further evaporation of the hot mixture occurs. The degree of evaporation depends of course on relation of the temperatures and pressures in heaters 2 and 5 and the pressure in separator 7. Other conditions being equal, decreasing the pressure in separator 7 will increase the degree of evaporation taking place therein and consequently increase the cooling effect on the separated liquid foodstuff. The heat-processed foodstuff is withdrawn through pipe 8. The vapors from separator 7 flow through pipe 9 into distillation column 10. The overhead fraction evolved in the distillation containing the volatile essences flows through pipe 11 into condenser 12. Part of the condensate may be returned to the column via pipe 13, and pipe 15, the reflux ratio being controlled by adjustment of valve 14. The remainder of the condensate containing volatile components is withdrawn through pipe 16 and is ready to be returned to the food product.

Figure 2:
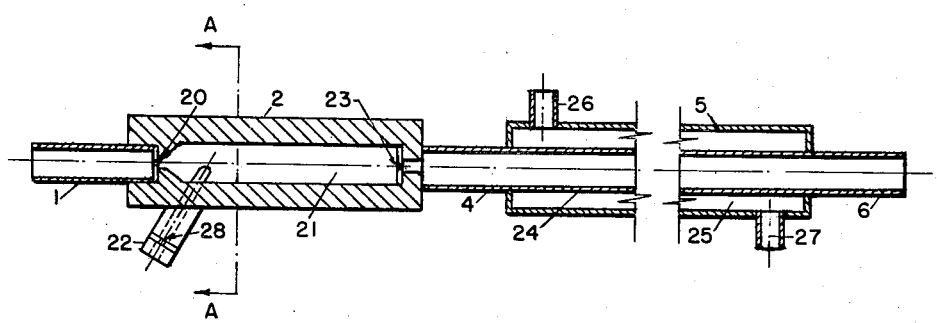
Fig. 2 represents a side elevation in cross-section of the steam injection heater and the tubular heater. Part of the tubular heater is broken away to reduce the size of the drawing.
Figure 3:
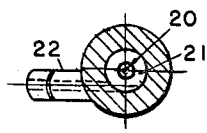
Fig. 3 represents a cross-section of the steam injection heater taken along plane A—A of Fig. 2.

In Figs. 2 and 3 of the drawing annexed hereto are shown the steam injector heater and tubular heater in accordance with this invention. These devices and their functions are described as follows:

The foodstuff to be processed is pumped through pipe 1 and orifice 20 into mixing chamber 21. At the same time steam is introduced through inlet 22 and orifice 28, into mixing chamber 21. Inlet 22 is arranged so that the incoming steam meets the stream of liquid foodstuff at an acute angle and moreover inlet 22 enters the mixing chamber tangentially. Both of these factors cause the incoming stream of steam to take a spiral path in chamber 21 thereby creating turbulence with the result that the foodstuff and steam are intimately mixed. The hot mixture then flows through orifice 23 and then into pipe 4. Orifice 23 is necessary to maintain the pressure within chamber 21 above that corresponding to the vapor-liquid equilibrium pressure of the feed-steam mixture in the tubular heater 5. As the hot material passes through orifice 23 it is partially evaporated to form a mixture of liquid and vapor with attendant increase in velocity. The rapidly moving mixture passes through pipe 4, tube 24, pipe 6, and into separator 7. During its passage through tube 24, the mixture is heated by the steam supplied to jacket 25. Steam is supplied to jacket 25 by pipe 26 and the condensed steam is withdrawn through pipe 27.

The following examples demonstrate the invention as applied to particular materials under particular conditions. It is understood that these examples are furnished only by way of illustration and not limitation.

The processes set forth in these examples were carried out in apparatus as hereinabove described. The steam injector unit had the following dimensions: mixing chamber 21, 6" long, ¾" diameter; orifice 20, .0700" diameter; orifice 23, .0635" diameter; orifice 28, 0.173" diameter. The tubular heater unit had the following dimensions: length of tube 24, 6 ft., inside diameter 0.62". The abbreviation "p. s. i. g." means pounds per square inch gauge pressure.

It will be noted, in relation to Figure 2, that the internal diameter of heat exchange tube 24 is not much different, if at all, from that of chamber 21. Consequently, expansion of the liquid into vapor through restricted orifice 23 results in greatly increased velocity of the mixture of liquid and vapor in 24.

*Example I*

A lot of fresh apple juice was processed in the above-described apparatus for the purpose of stripping the volatile essences therefrom. This stripping operation is useful in preparing an apple juice concentrate as the stripped juice may then be further concentrated without recovering the vaporized material. At the same time the volatile essences recovered in the stripping operation may be concentrated by rectification or other means and eventually returned to the concentrated juice.

A total of 1051 lbs. of the juice was processed at a rate of 300 lbs./hr. The juice was introduced into steam injector unit 2 at about 70 p. s. i. g. and a temperature of 57° F.

A total of 157 lbs. of steam was introduced through inlet 22 at 60 p. s. i. g. The conditions existing in mixing chamber 21 were pressure 54 p. s. i. g., temperature 212° F. Steam at 88 p. s. i. g. was supplied to jacket 25. The conditions existing in tube 24 were approximately: pressure, 0 p. s. i. g., temperature 212° F.

The conditions in separator 7 were approximately: pressure, 0 p. s. i. g.; temperature, 212° F.

A total of 223 lbs. of vapor passed through pipe 9 into packed column 10 where it was rectified, the reflux ratio being so adjusted to obtain 10 lbs. of concentrated essence, 213 lbs. of water remaining in the still being discarded.

A total of 985 lbs. of stripped juice at 212° F. was removed from separator 7 via pipe 8. This juice was then passed through a plate cooler to bring it to room temperature.

*Example II*

A lot of fresh apple juice was processed in the apparatus as described above for the purpose of stripping the volatile essences therefrom and to effect a 10% concentration of the juice.

A total of 402 lbs. of the juice was processed at a rate of 230 lbs./hr. The juice was introduced into steam injector unit 2 at 47 p. s. i. g. and a temperature of 61° F.

A total of 61 lbs. of steam was introduced through inlet 22 at 44 p. s. i. g. The conditions existing in mixing chamber 21 were: pressure, 34 p. s. i. g.; temperature, 217° F.

Steam at 60 p. s. i. g. was supplied to jacket 25. The conditions existing in tube 24 were approximately: pressure 0 p. s. i. g.; temperature, 212° F.

The conditions in separator 7 were approximately: pressure, 0 p. s. i. g.; temperature, 212° F.

A total of 100 lbs. of vapor passed through pipe 9 into packed column 10 where the vapor was rectified, the reflux ratio being so adjusted as to obtain 4 lbs. of concentrated essence, the 96 lbs. of water remaining in the still being discarded.

A total of 363 lbs. of stripped, concentrated juice at 212° F. was removed from separator 7 via pipe 8.

Having thus described our invention, we claim:

1. A method for stripping the volatile essences from a fruit juice which comprises simultaneously introducing, into a first zone, the liquid juice and steam in the proportion of about 0.1 lb. of steam per lb. of juice for each 100° F. rise in temperature, whereby the increment of steam admitted is substantially the amount required to raise the simultaneously-admitted increment of fruit juice to the temperature desired, maintaining the mixture under turbulent flow conditions and at a temperature of at least 212° F. and under superatmospheric pressure to prevent boiling, the mixture being retained in this first zone for less than one second, immediately discharging the hot mixture through a restricted orifice into a second zone maintained under lower pressure whereby part of the mixture is vaporized, heating the resulting mixture of liquid and vapor under turbulent flow conditions in said second zone by thermal exchange with a hot medium through a heat transfer surface, then discharging the mixture into a third zone to separate the vapor from the liquid, the total time that the juice is subject to heat being less than 2 seconds, separately collecting the vapor which contains the volatile essences and the liquid which constitutes the stripped juice.

2. A method for stripping the volatile essences from a fruit juice which comprises simultaneously introducing, into a first zone, the liquid juice and steam in the proportion of about 0.1 lb. of steam per lb. of juice for each 100° F. rise in temperature, whereby the increment of steam admitted is substantially the amount required to raise the simultaneously-admitted increment of fruit juice to the temperature desired, maintaining the mixture under turbulent flow conditions and at a temperature of at least 212° F. and under superatmospheric pressure to prevent boiling, the steam being introduced tangentially to the inner longitudinal wall surface of the said zone, and at an acute angle to the longitudinal axis of said zone and toward the exit of said zone, the fruit juice liquid being introduced longitudinally to the longitudinal axis of said zone and toward the exit therefrom, whereby the steam and juice are quickly and intimately mixed, and the hot juice quickly removed, the mixture being retained in this first zone for less than one second, immediately discharging the hot mixture through a restricted orifice into a second zone maintained under lower pressure whereby part of the mixture is vaporized, heating the resulting mixture of liquid and vapor under turbulent flow conditions in said second zone by thermal exchange with a hot medium through a heat transfer surface, then discharging the mixture into a third zone to separate the vapor from the liquid, the total time that the juice is subject to heat being less than 2 seconds, separately collecting the vapor which contains the volatile essences and the liquid which constitutes the stripped juice.

3. A method for stripping the volatile essences from apple juice which comprises simultaneously introducing into a first zone the juice and steam in the proportion of about 0.1 lb. of steam per lb. of juice for each 100° F. rise in temperature, maintaining the mixture under turbulent flow conditions and at a temperature of at least 212° F. and under superatmospheric pressure to prevent boiling, the mixture being retained in this first zone for less than one second, immediately discharging the hot mixture through a restricted orifice into a second zone maintained under lower pressure whereby part of the mixture is vaporized with a resulting increase in volume and concomitant increase in velocity, heating the resulting mixture of liquid and vapor under turbulent flow conditions in said second zone by indirect thermal exchange with a hot medium, then discharging the mixture into a third zone to separate the vapor from the liquid, the total time that the juice is subject to heat being less than 2 seconds, separately collecting the vapor which contains the volatile essences and the liquid which constitutes the stripped juice.

4. A method for stripping the volatile essences from apple juice which comprises simultaneously introducing, into a first zone, the juice and steam in the proportion of about 0.1 lb. of steam per lb. of juice for each 100° F. rise in temperature, whereby the increment of steam admitted is the amount required to raise the simultaneously-admitted increment of juice to the temperature desired, maintaining the mixture under turbulent flow conditions and at a temperature of at least 212° F. and under superatmospheric pressure to prevent boiling, the mixture being retained in this first zone for less than one second, immediately discharging the hot mixture through a restricted orifice into a second zone maintained under lower pressure whereby part of the mixture is vaporized, heating the resulting mixture of liquid and vapor under turbulent flow conditions in said second zone by thermal exchange with a hot medium through a heat transfer surface, then discharging the mixture into a third zone to separate the vapor from the liquid, the total time that the juice is subject to heat being less than 2 seconds, separately collecting the vapor which contains the volatile essences and the liquid which constitutes the stripped juice.

THEODORE WASSERMAN.
MELVIN E. LAZAR.

REFERENCES CITED

The following references are of record in the file of this patent:

UNITED STATES PATENTS

| Number | Name | Date |
|---|---|---|
| 516,509 | Popp et al. | Mar. 13, 1894 |
| 1,005,275 | Mollinger | Oct. 10, 1911 |
| 1,714,597 | Grindrod | Mar. 28, 1929 |
| 1,819,023 | Grindrod | Aug. 18, 1931 |
| 2,054,065 | Ayers et al. | Sept. 15, 1936 |
| 2,130,645 | Horneman | Sept. 20, 1938 |
| 2,237,739 | Jones | Apr. 8, 1941 |
| 2,238,373 | Rogers | Apr. 15, 1941 |
| 2,239,397 | North | Apr. 22, 1941 |
| 2,401,077 | Johnston | May 28, 1946 |
| 2,492,635 | Hawk | Dec. 27, 1949 |